US012711629B2

(12) United States Patent
Zhang et al.

(10) Patent No.: US 12,711,629 B2
(45) Date of Patent: Aug. 18, 2026

(54) DEVICE AND METHOD FOR TRAINING AN IMAGE SEGMENTATION SYSTEM

(71) Applicant: Robert Bosch GmbH, Stuttgart (DE)

(72) Inventors: Dan Zhang, Leonberg (DE); Kaspar Sakmann, Stuttgart (DE); Robin Hutmacher, Renningen (DE); William Harris Beluch, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 221 days.

(21) Appl. No.: 18/776,906

(22) Filed: Jul. 18, 2024

(65) Prior Publication Data

US 2025/0045927 A1 Feb. 6, 2025

(30) Foreign Application Priority Data

Aug. 3, 2023 (EP) .................................... 23189575

(51) Int. Cl.
*G06T 7/10* (2017.01)
*G06T 11/60* (2026.01)
(Continued)

(52) U.S. Cl.
CPC ................ *G06T 7/10* (2017.01); *G06T 11/60* (2013.01); *G06V 10/764* (2022.01); *G06V 20/70* (2022.01)

(58) Field of Classification Search
CPC ... G06T 7/10; G06T 11/60; G06T 7/11; G06T 2207/20081; G06T 2207/20084; G06T 2207/30252; G06T 3/04; G06T 7/0002; G06V 10/764; G06V 20/70; G06V 10/26; G06V 10/774; G06V 10/776; G06V 10/82; G06F 18/2433; G06N 3/045;
(Continued)

(56) References Cited

U.S. PATENT DOCUMENTS

2018/0061058 A1* 3/2018 Xu ........................... G06T 7/11

OTHER PUBLICATIONS

Tian et al., "Pixel-Wise Energy-Biased Abstention Learning for Anomaly Segmentation on Complex Urban Driving Scenes," Computer Vision—ECCV 2022: 17th European Conference, Proceedings, Part XXXIX, 2022, pp. 246-263.

(Continued)

*Primary Examiner* — Stephen R Koziol
*Assistant Examiner* — Michael Kim Maiden
(74) *Attorney, Agent, or Firm* — NORTON ROSE FULBRIGHT US LLP

(57) ABSTRACT

A computer-implemented method for training an image segmentation system. The method includes: obtaining a training image and a training label map, wherein the training label map indicates pixels of the training image as belonging to an anomaly class; providing the training image as input to the image segmentation system, wherein the image segmentation system determines values characterizing logits for different classes for pixels of the training image; determining a loss value based on a loss function, wherein the loss function comprises a first term that characterizes a logarithm of a sigmoid of logits determined for pixels in the training image, wherein the logarithm of the sigmoid is determined for pixels, which are labeled as belonging to the anomaly class in the training label map; training the image segmentation system (60) by minimizing the loss value.

12 Claims, 6 Drawing Sheets

(51) Int. Cl.
*G06V 10/764* (2022.01)
*G06V 20/70* (2022.01)

(58) Field of Classification Search
CPC ........ G06N 3/0475; G06N 3/084; G06N 3/09; G06N 3/094; G06N 3/0455; G06N 20/00
See application file for complete search history.

(56) References Cited

OTHER PUBLICATIONS

Katz-Samuels et al., "Training OOD Detectors in Their Natural Habitats," Proceedings of the 39th International Conference on Machine Learning, PMLR 162, 2022, pp. 1-17.
Gawlikowski et al., "An Advanced Dirichlet Prior Network for Out-Of-Distribution Detection in Remote Sensing," IEEE Transactions on Geoscience and Remote Sensing, vol. 60, 2022, pp. 1-19.
Zolfi et al., "YOLOOD: Utilizing Object Detection Concepts for Out-Of-Distribution Detection," Proceedings of the IEEE/CVF Conference on Computer Vision and Pattern Recognition (CVPR), 2022, pp. 1-10.
Nayal et al., "RBA: Segmenting Unknown Regions Rejected by All," 2023 IEEE/CVF International Conference on Computer Vision (ICCV), 2023, pp. 711-722. https://openaccess.thecvf.com/content/ICCV2023/papers/Nayal_RbA_Segmenting_Unknown_Regions_Rejected_by_All_ICCV_2023_paper.pdf Downloaded Jul. 15, 2024.
Li et al., "Intra- & Extra-Source Exemplar-Based Style Synthesis for Improved Domain Generalization," International Journal of Computer Vision, vol. 132, 2023, pp. 446-465. https://link.springer.com/article/10.1007/s11263-023-01878-8 Downloaded Jul. 15, 2024.

* cited by examiner

DEVICE AND METHOD FOR TRAINING AN IMAGE SEGMENTATION SYSTEM

CROSS REFERENCE

The present application claims the benefit under 35 U.S.C. § 119 of European Patent Application EP 23 18 9575.6 filed on Aug. 3, 2023, which is expressly incorporated herein by reference in its entirety.

FIELD

The present invention relates to a computer-implemented method for training an image segmentation system, a computer implemented method for detecting anomalies in images, a training system, a control system, a computer program and a machine-readable storage device.

BACKGROUND INFORMATION

Tian et al. "Pixel-wise energy-biased abstention learning for anomaly segmentation on complex urban driving scenes". arxiv.org/pdf/2111.12264.pdf, 2022 describes an anomaly segmentation method, named pixel-wise energy-biased abstention learning (PEBAL), that explores pixel-wise abstention learning (AL) with a model that learns an adaptive pixel-level anomaly class, and an energy-based model (EBM) that learns inlier pixel distribution. PEBAL is based on a joint training of EBM and AL, where EBM is trained to output high-energy for anomaly pixels (from outlier exposure) and AL is trained such that these high-energy pixels receive adaptive low penalty for being included to the anomaly class.

Nayal et al. "RbA: Segmenting Unknown Regions Rejected by All" arxiv.org/pdf/2211.14293.pdf, 2022 describes an outlier scoring function called RbA by defining the event of being an outlier as being rejected by all known classes. Experiments show that mask classification improves the performance of the existing outlier detection methods, and the best results are achieved with the proposed RbA.

Li et al. "Intra-& Extra-Source Exemplar-Based Style Synthesis for Improved Domain Generalization", arxiv.org/pdf/2307.00648.pdf, 2023 describes a an exemplar-based style synthesis pipeline to improve domain generalization in semantic segmentation, in particular a masked noise encoder in combination with a StyleGAN2.

Perceiving an environment and detecting contents of the environment is an important task in different technical applications, e.g., robotics. A typical goal is to use sensors such as cameras to detect objects, vegetation, or other relevant items, e.g., to not collide with elements of the environment.

Especially for safety-critical applications, such as autonomous driving (AD), the ability to detect unknown objects (Out-of-distribution objects, OoD objects) is critical. This may also be understood as identifying anomalous objects. More specifically, detecting pixels of an unknown or anomalous object in a semantic segmentation scenario is a core perception task for mobile robots such as, e.g., autonomous vehicles.

Semantic segmentation tasks are typically solved by neural networks. It is thus desirable to enable neural networks configured for semantic segmentation to also be able to detect unknown or anomalous pixels so that on overall system using the neural network for modelling an environment can precisely identify unknown or anomalous objects and separate them from the drivable space.

A core difficulty of OoD detection is the vast amount of possible OoD objects compared to the relatively small number of object categories that the neural network is trained on. Moreover, semantic segmentation typically deals with scene-centric input images, i.e., images in which OoD objects co-locate with many other known objects and elements of the environment. This poses an even greater challenge compared to OoD detection on object-centric data (e.g., image classification benchmarks). Another challenge that comes with scene-centric images is class imbalances. For example, road pixels in AD scenes often make up a large part of the training data and bias the neural network towards predicting road. Due to the imbalance in training data, neural networks often exhibit a tendency to predict the majority class for OoD objects found on the road, a critical error that carries the highest level of risk.

A particularly successful technique for detecting unknown or anomalous objects in a semantic segmentation task (also known as anomaly segmentation) is a form of outlier exposure. Namely, while one does not have access to potential OoD scenarios at inference time, there are many ready-to-use datasets different to the training data, that can serve as OoD exemplars during training. For instance, the MS COCO dataset is a popular OoD proxy dataset for training semantic segmentation. For example, it is possible to cut and then paste specific objects comprised by the MS COCO dataset into road scenes to create anomalous examples for, e.g., AD scenes.

The OoD data constructed this way can be used either during training a neural network from scratch or during finetuning of a pre-trained model. The inventors found that using OoD data for training from scratch can degrade the in-distribution generalization performance of the neural network (i.e., its semantic segmentation performance on known and/or non-anomalous pixels) and require architectural changes in the neural network. In contrast, the inventors found that when using OoD data only during finetuning a pre-trained neural network, the neural network is usually under the constraint of small weight changes and thus less prone to overfitting.

Based on these findings, the present invention advantageously provides a new method for generating OoD data by adapting a style of OoD data copy and pasted upon an existing image. The style transfer leads to the training data being more suitable for training to detect unknown or anomalous objects as a neural network trained with this data cannot rely on the style of the pasted content (i.e., that it looks "off" with respect to the rest of the image) to determine whether pixels are anomalous or not. The present invention further proposes an advantageous method for training a neural network based on data as generated from the method of generating OoD data.

SUMMARY

In a first aspect, the present invention concerns a computer-implemented method for training an image segmentation system. According to an example embodiment of the present invention, the method comprises the following steps:

- Obtaining a training image and a training label map, wherein the training label map indicates pixels of the training image as belonging to an anomaly class;
- Providing the training image as input to the image segmentation system, wherein the image segmentation system determines values characterizing logits for different classes for pixels of the training image;

Determining a loss value based on a loss function, wherein the loss function comprises a first term that characterizes a logarithm of a sigmoid of logits determined for pixels in the training image, wherein the logarithm of the sigmoid is determined for pixels, which are labeled as belonging to the anomaly class in the training label map.

Training the image segmentation system by minimizing the loss value.

According to an example embodiment of the present invention, the image segmentation system may be configured to perform a semantic segmentation and/or an instance segmentation of a provided input image. This may especially be achieved by the image segmentation system comprising or consisting of a neural network configured for image segmentation and/or instance segmentation. Semantic segmentation and/or instance segmentation may especially be understood as specific forms of image classifications.

According to an example embodiment of the present invention, the method for training may especially comprise training the neural network in a supervised fashion. The image segmentation system may also comprise pre-processing steps which are applied to an input image provided to the image segmentation system and/or post-processing steps applied to an output of the image segmentation system.

According to an example embodiment of the present invention, the method for training may be run "from scratch", i.e., with an untrained image segmentation system, or as a finetuning method, wherein the image segmentation system has been trained on other data before training it with one or multiple generated images.

According to an example embodiment of the present invention, the method for training may preferably also be run with a batch of generated training images, i.e., the method for generating a training image may be run multiple times with different images and/or different replaced pixels in order to determine a batch of training images. Preferably, generated images and images without any replace pixels, e.g., first images, are combined in a batch.

An image can be understood as being obtained by synthesis (e.g., rendering from virtual scenes in a computer) or by being recorded from a sensor, in particular an optical sensor. In this case, images may be understood as outputs of a camera, a lidar, a radar, an ultrasonic sensor, or a thermal sensor.

Obtaining an image may be understood as any way of acquiring the image, e.g., by means of recording it with the respective sensor or retrieving it from a database of images.

A label map can generally be understood as an annotation of an image, wherein the annotation assigns class labels to a subset of pixels, preferably all pixels, of an image the label map corresponds to. Correspondence can typically be achieved by means of the label map having a same width and height as does the image, wherein each pixel may be assigned a position in the image and may additionally be assigned a class label (e.g., an integer characterizing an index of a class) in the label map, wherein the class label may itself be assigned a position in the label map. The positions may be characterized by indices along a width and height dimension of the image and the label map respectively. The label map may hence be given by a matrix of integers indicating class labels.

A label map corresponding to an image may be understood as the label map comprising classifications for each pixel of the image.

The term "to minimize the loss value" may preferably be understood as performing steps such that the loss value is smaller if a same input is provided to the image segmentation system. This may especially be achieved by means of a gradient descent method, especially a stochastic gradient descent method. Alternatively, other training methods are possible as well, e.g., methods based on evolutionary algorithms.

Advantageously, the inventors found that using the logits of the pixels indicated as "anomalous" this way can be understood as training the image segmentation system as a one vs. the rest (OvR) classifier for each pixel, i.e., the system may indicate for each pixel and for each "non-anomalous" class how likely it is that the pixel belongs to the class. If each "non-anomalous" class for a pixel is unlikely (e.g., the logits characterize a probability equal to or below 50%), the pixel can be considered as an anomaly. The inventors found that this advantageously increases the ability of the image segmentation system to correctly indicate if a pixel is anomalous or not.

Even more advantageously, the inventors found that the proposed loss function can be applied during finetuning of the image segmentation system only. This may especially be understood as the method for training not requiring any other ground truth data and only finetuning the image segmentation system based on the loss function, preferably comprising only the first term.

Alternatively, the loss function may also comprise a second term that characterizes a standard loss for semantic segmentation for pixels of the image, which are not indicated as anomalous. For example, a softmax function may be applied to logits of non-anomalous pixels and the second loss term may be characterized or given by a cross entropy loss with respect to the training label map may be determined for non-anomalous pixels, preferably all non-anomalous pixels.

Preferably, the first term characterizes a logarithm of a sigmoid of a predefined amount of largest logits.

Advantageously, the inventors found that limiting the amount of logits for which a logarithm of a sigmoid of the logit is determined further increases the performance of the image segmentation system, i.e., its ability to correctly indicate whether a pixel is anomalous or not.

The amount of logits for which a logarithm of a sigmoid is determined can be considered a hyperparameter of the method. It may be tuned according to any suitable hyperparameter tuning method. The inventors found small values to perform particularly well, especially using the three, five, or seven largest logits per pixel. However, other amounts may be suitable as well.

According to an example embodiment of the present invention, preferably, the first loss term is characterized by the formula:

$$\mathcal{L}_{ood} = -\frac{1}{K \cdot N_{ood}} \sum_{i,j \in ood} \sum_{k \in S_{i,j}} \log\sigma\left(\lambda_{i,j}^{(k)}\right),$$

wherein i,j are height and width coordinates of a pixel, ood are pixel coordinates of pixels indicated as anomalous, $N_{ood}$ is the amount of pixels in ood, K is the amount of logits for which to determine a logarithm of a sigmoid, $S_{i,j}$ is a set of the K logits and $$\lambda_{i,j}^{(k)}$$

is the k-th logit in the set of logits for the pixel at position i,j.

The first loss term may preferably be multiplied by a factor constituting a further hyperparameter of the method for training. The loss function from which the loss value is determined may be hence characterized by the formula $$\mathcal{L} = \mathcal{L}_{semseg} + \lambda_{ood} \cdot \mathcal{L}_{ood},$$

wherein $\mathcal{L}_{semseg}$ characterizes the second loss term and $\lambda_{ood}$ characterizes the factor.

The loss function may be extended by further terms, e.g., for regularizing the training of the image segmentation system.

According to an example embodiment of the present invention, preferably, the training image ($x_i$) and the training label map ($t_i$) is obtained by generating the training image ($x_i$) and the training label map ($t_i$), wherein generating the training image ($x_i$) and the training label map ($t_i$) comprises the steps of:

- Obtaining a first image ($i_1$) and a first label map ($l_1$) corresponding to the first image ($l_1$) and obtaining a second image ($i_2$) and a second label ($l_2$) map corresponding to the second image ($i_2$);
- Determining a third image ($i_3$), wherein the third image is determined by providing the second image ($i_2$) as input to a machine learning system (70), wherein the machine learning system (70) is configured for determining images in the style of the first image ($i_1$) based on provided images;
- Determining the training image ($x_i$) by replacing pixels from the first image ($i_1$) with pixels from the third image ($i_3$), wherein the pixels from the third image ($i_3$) are determined based on a class from the second label map ($l_2$);
- Determining the training label ($t_i$) map by replacing class labels from the first label map ($l_1$) with class labels indicating an anomaly class, wherein the class labels in the first label map ($l_1$) are replace for which corresponding pixels in the first image ($i_1$) are replaced.

This may be understood as augmenting the first image with pixels from the second image, wherein the second image is first brought into a similar or same style as the first image. Advantageously, this style alignment between the first image and the second image allows for a realistic embedding of the pixels of the second image into the first image. In other words, the pixels from the third image (i.e., the second image after style alignment) look as if they could actually belong into the first image.

Training an image segmentation system with such a generated image increases the diversity of training data and leads to an increased performance of the image segmentation system. Even more advantageously, the copied pixels are marked in the training label map as depicting an anomaly (either through the anomaly class or through the additional indication in the label map), wherein the training label map may then be used for training the image segmentation system for determining whether a specific pixel in a given image is anomalous or not.

Due to the pixels from the third image being in the style of the pixels from the first image, the image segmentation system cannot rely on a style of the replaced pixels as indicator for anomalous pixels and thus advantageously has to learn to reason whether pixels in an image are anomalous or not based on a semantic content of the image (e.g., non-flying objects located in the sky are likely anomalies).

In case the replaced class labels in the first label map are further indicated as resulting from replacement, the indication may be achieved by, e.g., assigning a special class label that simultaneously indicates a corresponding class from the second label map as well as "anomaly" (e.g., by adding a predefined offset to the integer representing the otherwise non-anomalous class). Alternatively, an additional binary map may be provided alongside the generated training label map indicating for each pixel of the generated training image, whether the pixel characterizes an anomaly or not, i.e., whether the pixel has been copied from the third image or not. The binary map may be provided in the form of a matrix of binary or integer elements.

Anomalies may be understood as parts of images (depicted through pixels of the images) which constitute rare, uncommon, or unreasonable objects. Anomalous pixels may be understood as pixels which belong to anomalous objects.

The machine learning system may especially be understood as being configured such that a semantic content of its input is not changed in its output, but a style is changed. For example, the machine learning system may be given by a neural network, which comprises a masked noise encoder and a StyleGAN2, wherein the neural network is further configured (i.e., trained) for changing style of images provided as input.

The term "determining images in the style of the first image based on provided images" may especially be understood in so far as the machine learning system being configured for accepting images as input, wherein the machine learning system then transforms a provided input image into an output image, wherein the output image has a different style from the input image but a similar or same semantic content.

According to an example embodiment of the present invention, the first image may especially be obtained at random from a dataset of first images. This may be understood as the first images having a similar visual style due to being, e.g., being recorded by a same sensor and/or a same environmental condition of the sensor.

Determining the training image by replacing pixels from the first image with pixels from the third image may be understood as providing the image that results from replacing pixels from the first image with the respective pixels of the third image as the training image.

The pixels in the first image, which are replaced by pixels from the third image may be chosen at random. For example, a random position may be chosen in the first image and the pixels from the third image may be superimposed into that position such that a center of the pixels from the third image is located at the random position. In this case, the pixels to be replace in the first image may be understood be determined implicitly. Alternatively, the pixels to be replaced in the first image may be chosen based on a class of the first label map. For example, if the pixels from the third image to be pasted onto the first image constitute pixels of an object, the pixels in the first image may be chosen such that they represent pixels which characterize parts in the first label map that can reasonably comprise objects, e.g., free spaces such as roads, sidewalks or the like.

Alternatively, according to an example embodiment of the present invention, it is also possible to select a position in the first image that characterizes a part of the first label map that can reasonably comprise objects and the pixels from the third image may be copied into the first image such that a center of the pixels from the third image is located at the position.

In all examples, the center position was merely chosen exemplarily. One may also use other positions, e.g., corners or other desired positions.

Preferably, the pixels to be replaced are determined at random. This expression is also understood as including methods, where a single location in the first image is chosen at random and the pixels from the third image are copied into the first image as described above.

Preferably, replacing class labels from the first label map is achieved by replacing class labels from the first label map with class labels from the second label map, wherein the class labels from the second label map are used for replacement for which corresponding pixels have been used as replacement in the first image, wherein the replaced class labels in the first label map are further indicated as resulting from replacement.

Alternatively, according to an example embodiment of the present invention, it is also possible to assign a designated "anomaly" class to elements of the training label map for which corresponding pixels in the training image have been determined by copying from the third image.

Preferably, according to an example embodiment of the present invention, the first image is transformed in an augmentation operation before determining the training image.

The first image may, for example, be cropped or resized before it is subjected to replacement of pixels. The augmentation may be any conventional augmentation operation. The result of the augmentation operation may then be used as first image for subsequent operations, e.g., for determining the training image.

Advantageously, the inventors found that the image segmentation system performs even better when training with an augmented first image.

Preferably, according to an example embodiment of the present invention, the machine learning system determines its output based on providing its input to a masked noise encoder of the machine learning system and providing an output of the masked noise encoder to a StyleGAN2.

The masked noise encoder and the StyleGAN2 may especially be understood as sub-networks of a combined neural network. The architecture of the masked noise encoder may be that of a the pSp encoder. The masked noise encoder may map a provided input image to an extended latent space $W^+$ of a pre-trained StyleGAN2 generator. The pre-trained StyleGAN2 generator may especially be pre-trained on images comprising complex scene data such as urban driving scenarios or other similar images.

The inventors found that, advantageously, the combination of masked noise encoder and StyleGAN2 leads to a better style transfer of the style of the first image and hence to a better first training image, which in turn leads to an increased performance of the image segmentation system when using the training image for training or an improved assessment of the generalization capability of the image segmentation system when using the training image during testing of the image segmentation system.

Alternatively, according to an example embodiment of the present invention, other style transfer machine learning systems may be used on the method as well, e.g., machine learning systems based on diffusion models such as diffusion models configured for interpolating between images.

According to an example embodiment of the present invention, preferably, the first image is comprised by a first dataset of first images and the machine learning system is trained to transfer input images into a style of the first images.

This may especially be understood as the method comprising an extra step of training the machine learning system as part of the method for generating the image. Alternatively, it may be understood as obtaining the machine learning system after training on the first images, e.g., by downloading it from a resource on the internet.

Some or all of the preferred embodiments of the method for training according to the present invention as described above may be combined to form further embodiments.

In another aspect, the present invention concerns a computer-implemented method for determining an output signal, wherein the output signal characterizes a classification of a pixel of an input image as anomalous or not. According to an example embodiment of the present invention, the method comprises the following steps:

- Providing the input image as input to an image segmentation system, wherein the image segmentation system has been trained with a method according to any one of the above-described embodiments;
- Determining, by the image segmentation system, logits for the pixel;
- Providing a classification of the pixel as anomalous in the output signal if a difference of a largest determined logit and a smallest determined logit is smaller or equal to a predefined threshold and providing a classification of the pixel as non-anomalous in the output signal otherwise.

The term "wherein the image segmentation system has been trained with a method" may be understood as the steps of the method for training being executed as part of the method for determining the output signal. Alternatively, it may also be understood as obtaining an image segmentation system that has been trained as described above, e.g., from a resource on the internet.

According to an example embodiment of the present invention, preferably, the image segmentation system determines for a plurality of pixels, preferably for all pixels of the input image, whether a respective pixel is anomalous or not. Even more preferably, pixels being determined as anomalous may be grouped, e.g., by means of a connected components algorithm, in order to determine areas in the image deemed to be anomalous. The grouped areas may be put out in the output signal as well, e.g., by bounding boxes enclosing pixels of a single connected component of anomalous pixels.

For determining a classification of the pixel as anomalous or not, an anomaly score may be determined for the pixel, wherein the anomaly score is preferably characterized by the formula $$s(\lambda_{i,j}) = \max_k \lambda_{i,j}^{(k)} - \min_k \lambda_{i,j}^{(k)}.$$

In other words, logits may be determined for all classes the pixel may probably be classified into and a difference of the the largest and smallest logit may then be used as anomaly score. Alternatively, it is also possible to multiply the result of the difference with −1 such that larger anomaly scores correspond to a higher likelihood of the pixel being anomalous. An anomaly score may also be determined for each pixel individually.

The output signal comprising the classification may especially be understood as the output signal comprising or consisting of a value characterizing the classification, e.g., the anomaly score or a binary value indicating whether anomaly score is smaller or equal to a predefined threshold (or equal to or larger to a predefined threshold if the difference is multiplied by −1).

Some or all of the preferred embodiments of the method for determining an output signal according to the present invention may be combined to from another embodiment.

Example embodiments of the present invention will be discussed with reference to the figures in more detail.

DETAILED DESCRIPTION OF EXAMPLE EMBODIMENTS

Figure 1:
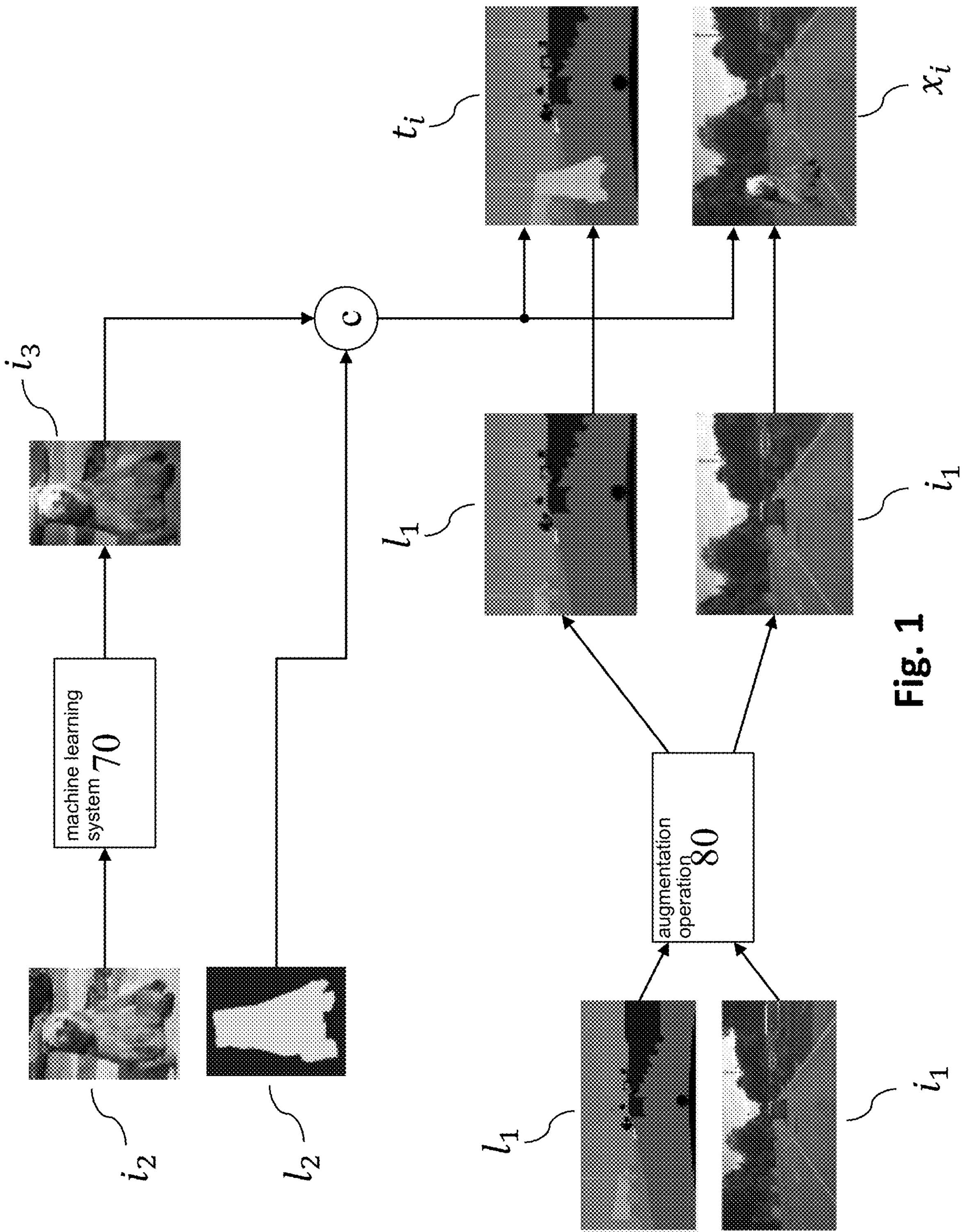
FIG. 1 shows a method for generating a training image and a training label map, according to an example embodiment of the present invention.

FIG. 1 schematically shows a method for generating a training image and a training label map.

The method comprises obtaining a first image ($i_1$) and a first label map ($l_1$) corresponding to the first image ($l_1$) and obtaining a second image ($i_2$) and a second label ($l_2$) map corresponding to the second image ($i_2$). The first image ($i_1$) and/or second image ($i_2$) may be obtained from respective databases of images or may be recorded by a sensor, especially an optical sensor such as a camera. The recording may also be part of the method. Preferably, the first image ($i_1$) and the second image ($i_2$) have different styles, e.g., the color distribution of pixels is significantly different. In the embodiment, the first image ($i_1$) depicts a road scene, e.g., an urban traffic scene, and the second image ($i_2$) comprises a bear, which is typically not seen in an urban traffic scene. The respective label maps ($l_1$, $l_2$) may be obtained by labelling the respective images ($i_1$, $i_2$) by a human or by an automated algorithm, i.e., may be auto-labeled.

The method further comprises determining a third image ($i_3$), wherein the third image is determined by providing the second image (2) as input to a machine learning system (70), wherein the machine learning system (70) is configured for determining images in the style of the first image ($i_1$) based on provided images.

The term “determining images in the style of the first image based on provided images” may especially be understood in so far as the machine learning system being configured for accepting images as input, wherein the machine learning system then transforms a provided input image into an output image, wherein the output image has a different style from the input image but a similar or same semantic content.

In particular, the machine learning system takes as input the second image ($i_2$, the image of the bear in the embodiment) and provides the third image ($i_3$, the image of the bear with a similarly color distribution as has the urban traffic scene in the first image).

The machine learning system may especially be configured to consist of a neural network comprising a masked noise encoder and a StyleGAN2 for determining the third image ($i_3$).

Based on the second label map ($l_2$) an object from the second image ($i_2$) may then be cut from the third image ($i_3$) in a cutting operation (c). Preferably, the cutting operation selects on object from the second label map ($l_2$) based on connected class labels of an object class (i.e., a connected component of plurality of specific class labels from a same object class).

The first image ($i_1$) and first label map ($l_1$) may be subject to an optional augmentation operation (80), e.g., cropping, resizing, rotation, warping or the like. The result may then again be used as first image ($i_1$) and first label map ($l_1$).

Irrespective of whether an augmentation operation is conducted, the method further comprises determining the training image ($x_i$) by replacing pixels from the first image ($i_1$) with pixels from the third image ($i_3$). In other words, pixels obtained from the cutting operation may then be copied (i.e., overlayed) over pixels from the first image ($i_1$) in order to determine the training image ($x_i$).

The pixels in the first image (i), which are replaced by pixels from the third image ($i_3$) may be chosen at random. For example, a random position may be chosen in the first image ($i_1$) and the pixels from the third image may be superimposed onto that position such that a center of the pixels from the third image ($i_3$) is located at the random position. In this case, the pixels to be replace in the first image ($i_1$) may be understood be determined implicitly. Alternatively, the pixels to be replaced in the first image ($i_1$) may be chosen based on a class of the first label map ($l_1$). For example, the pixels from the third image ($i_3$) to be pasted onto the first image ($i_1$) constitute pixels of an object and the pixels in the first image ($i_1$) may be chosen such that they represent pixels which characterize parts in the first label map ($l_1$) that can reasonably comprise objects, e.g., free spaces such as roads, sidewalks or the like.

The method further comprises determining the training label ($t_i$) map by replacing class labels from the first label map ($l_1$) with class labels indicating an anomaly class, wherein the class labels in the first label map ($l_1$) are replace for which corresponding pixels in the first image ($i_1$) are replaced. In other words, for the pixels, which are obtained by copying in the training image ($x_i$), the training label map ($t_i$) is determined to comprise class labels of an anomaly class.

Figure 2:
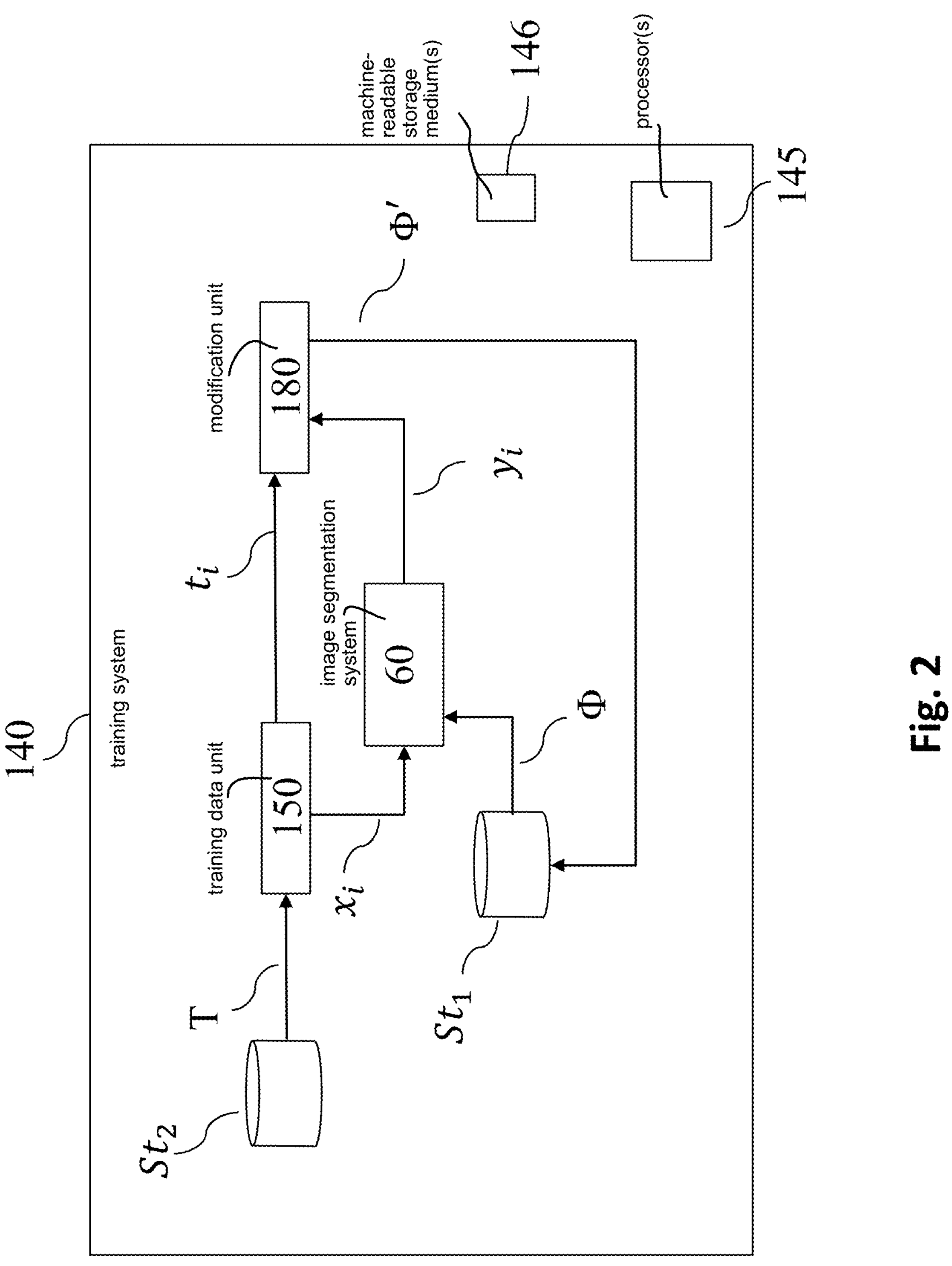
FIG. 2 shows a training system configured for executing a method for training an image segmentation system, according to an example embodiment of the present invention.

FIG. 2 shows an embodiment of a training system (140) for training an image segmentation system (60) by means of a training data set (T). The training data set (T) comprises a plurality of training images ($x_i$) and training label maps ($l_i$), wherein each training image ($x_i$) and training label map ($l_i$) has been obtained by the method depicted in FIG. 1. The training images ($x_i$) and training labels ($l_i$) show different content, e.g., by using different first images ($i_1$) and/or different second images ($i_2$) in the method for generating and/or using different locations a cut-out object from the third image ($i_3$) is copied into the first image ($i_1$)

For training, a training data unit (150) accesses a computer-implemented database ($St_2$), the database ($St_1$) providing the training data set (T). The training data unit (150) determines from the training data set (T) preferably randomly at least one training image ($x_i$) and the training label map ($t_i$) corresponding to the training image ($x_i$) and transmits the training image ($x_i$) to the image segmentation system (60). The image segmentation system (60) determines an output signal ($y_i$) based on the training image ($x_i$), wherein the output signal ($y_i$) characterizes a semantic segmentation and/or instance segmentation of the training image ($x_i$), preferably comprising logits for the different classes for each pixel.

The training label map ($t_i$) and the determined output signal ($y_i$) are transmitted to a modification unit (180).

Based on the training label map ($t_i$) and the determined output signal ($y_i$), the modification unit (180) then determines new parameters (Φ') for the image segmentation system (60), e.g., new parameters of the neural network comprised by the image segmentation system (60). For this purpose, the modification unit (180) compares the training label map ($t_i$) and the determined output signal ($y_i$) using a loss function, wherein the loss function comprises a first term that characterizes a logarithm of a sigmoid of logits determined for pixels in the training image, wherein the logarithm of the sigmoid is determined for pixels, which are labeled as anomaly class or indicated as anomalous in the training label map. The loss function determines a loss value as output. Preferably, the first loss term is characterized by the formula:

$$\mathcal{L}_{ood} = -\frac{1}{K \cdot N_{ood}} \sum_{i,j \in ood} \sum_{k \in S_{i,j}} \log\sigma\left(\lambda_{i,j}^{(k)}\right),$$

wherein i,j are height and width coordinates of a pixel, ood are pixel coordinates of pixels indicated as anomalous, $N_{ood}$ is the amount of pixels in ood, K is the amount of logits for which to determine a logarithm of a sigmoid, $S_{i,j}$ is a set of the K logits and $$\lambda_{i,j}^{(k)}$$

is the k-th logit in the set of logits for the pixel at position i,j.

Preferably, the first term $\mathcal{L}_{ood}$ may be understood as the only term of the loss function, i.e., the loss function being the first term. Alternatively, $\mathcal{L}_{ood}$ may be combined with further terms to form the loss function. For example, the loss function may comprise a second term that characterizes a standard loss for semantic segmentation for pixels of the image, which are not indicated as anomalous. For example, a softmax function may be applied to logits of non-anomalous pixels and the second loss term may be characterized or given by a cross entropy loss with respect to the training label map may be determined for non-anomalous pixels, preferably all non-anomalous pixels.

The first loss term may preferably be multiplied by a factor constituting a further hyperparameter of the method for training. The loss function from which the loss value is determined may be hence characterized by the formula $$\mathcal{L} = \mathcal{L}_{semseg} + \lambda_{ood} \cdot \mathcal{L}_{ood},$$

wherein $\mathcal{L}_{semseg}$ characterizes the second loss term and $\lambda_{ood}$ characterizes the factor.

The loss function may be extended by further terms, e.g., for regularizing the training of the image segmentation system.

The modification unit (180) determines the new parameters (Φ') based on the loss value. In the given embodiment, this is done using a gradient descent method, preferably stochastic gradient descent, Adam, or AdamW. In further embodiments, training may also be based on an evolutionary algorithm or a second-order method for training neural networks.

In other preferred embodiments, the described training is repeated iteratively for a predefined number of iteration steps or repeated iteratively until the loss value falls below a predefined threshold value. Alternatively or additionally, it is also possible that the training is terminated when an average first loss value with respect to a test or validation data set falls below a predefined threshold value. In at least one of the iterations the new parameters (Φ') determined in a previous iteration are used as parameters (Φ) of the image segmentation system (60).

Furthermore, the training system (140) may comprise at least one processor (145) and at least one machine-readable storage medium (146) containing instructions which, when executed by the processor (145), cause the training system (140) to execute a training method according to one of the aspects of the present invention.

In further embodiments (not shown) the training image ($x_i$) and training label map ($l_i$) may not be obtained from a database but may be generated in each iteration of training. In other words, the training image ($x_i$) and training label map ($l_1$) may be generated on the fly.

Figure 3:
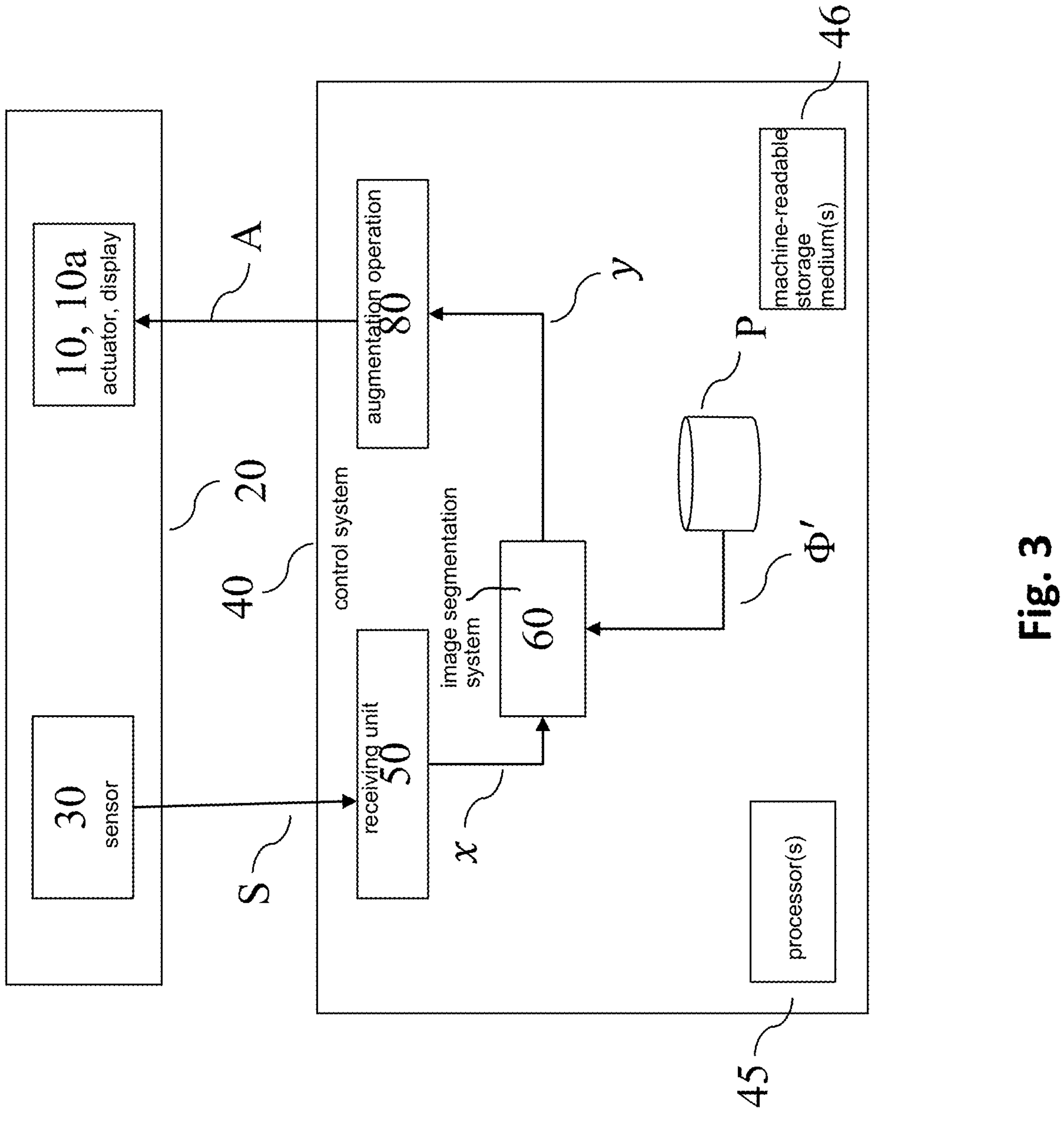
FIG. 3 shows a control system comprising a machine learning system controlling an actuator in its environment, according to an example embodiment of the present invention.

FIG. 3 shows an embodiment of a control system (40) controlling an actuator (10) in its environment (20) based on an output of the image segmentation system (60). The actuator (10) and its environment (20) will be jointly called actuator system. At preferably evenly spaced points in time, a sensor (30) senses a condition of the actuator system. The sensor (30) may comprise several sensors. Preferably, the sensor (30) is an optical sensor that takes images of the environment (20). An output signal(S) of the sensor (30) (or, in case the sensor (30) comprises a plurality of sensors, an output signal(S) for each of the sensors) which encodes the sensed condition is transmitted to the control system (40).

Thereby, the control system (40) receives a stream of sensor signals(S). It then computes a series of control signals (A) depending on the stream of sensor signals(S), which are then transmitted to the actuator (10).

The control system (40) receives the stream of sensor signals(S) of the sensor (30) in an optional receiving unit (50). The receiving unit (50) transforms the sensor signals (S) into input images (x). Alternatively, in case of no receiving unit (50), each sensor signal(S) may directly be taken as an input image (x). The input image (x) may, for example, be given as an excerpt from the sensor signal(S). Alternatively, the sensor signal(S) may be processed to yield the input image (x). In other words, the input signal (x) is provided in accordance with the sensor signal(S).

The input image (x) is then passed on to the image segmentation system (60).

The image segmentation system (60) is parametrized by parameters (Φ), which are stored in and provided by a parameter storage ($St_1$).

The image segmentation system (60) determines an output signal (y) from the input image (x). The output signal (y) a classification of a pixel, preferable a respective classification for each pixel, of the input image (x), wherein the classification characterizes whether the pixel is anomalous. The output signal (y) is transmitted to an optional conversion unit (80), which converts the output signal (y) anomaly scores and determines the control signals (A) based on the classification. Alternatively, the output signal (y) may be used directly as control signal (A).

The classification is preferably determined by the image segmentation system (60) by first determining an anomaly score for each pixel to be classified. The anomaly score may preferably be determined according to the formula $$s(\lambda_{i,j}) = \max_k \lambda_{i,j}^{(k)} - \min_k \lambda_{i,j}^{(k)},$$

wherein $$\lambda_{i,j}^{(k)}$$

is the k-th logit λ determined for the pixel of the input image (x) at position i,j in the input image (x).

The anomaly score may then be compared to a predefined threshold and the pixel may be classified as anomalous if the anomaly score is equal to or below the predefined threshold. Alternatively, the anomaly score may be multiplied by −1 and the pixel may be classified as anomalous if the result of the multiplication is equal to or above the predefined threshold. The threshold may be understood as a hyperparameter of the method for training.

If a pixel is not classified as anomalous, it may preferably be assigned a class indicating a normal pixel. This may be achieved by, e.g., assigning the pixel a class corresponding to the highest logit determined by the image segmentation system (60).

The control signals (A) are then transmitted to the actuator (10) for controlling the actuator (10) accordingly.

The actuator (10) receives control signals (A), is controlled accordingly and carries out an action corresponding to the control signal (A). The actuator (10) may comprise a control logic which transforms the control signal (A) into a further control signal, which is then used to control the actuator (10).

In further embodiments, the control system (40) may comprise the sensor (30). In even further embodiments, the control system (40) alternatively or additionally may comprise an actuator (10).

In still further embodiments, it can be envisioned that the control system (40) controls a display (10*a*) instead of or in addition to the actuator (10).

Furthermore, the control system (40) may comprise at least one processor (45) and at least one machine-readable storage medium (46) on which instructions are stored which, if carried out, cause the control system (40) to carry out a method according to an aspect of the present invention.

Figure 4:
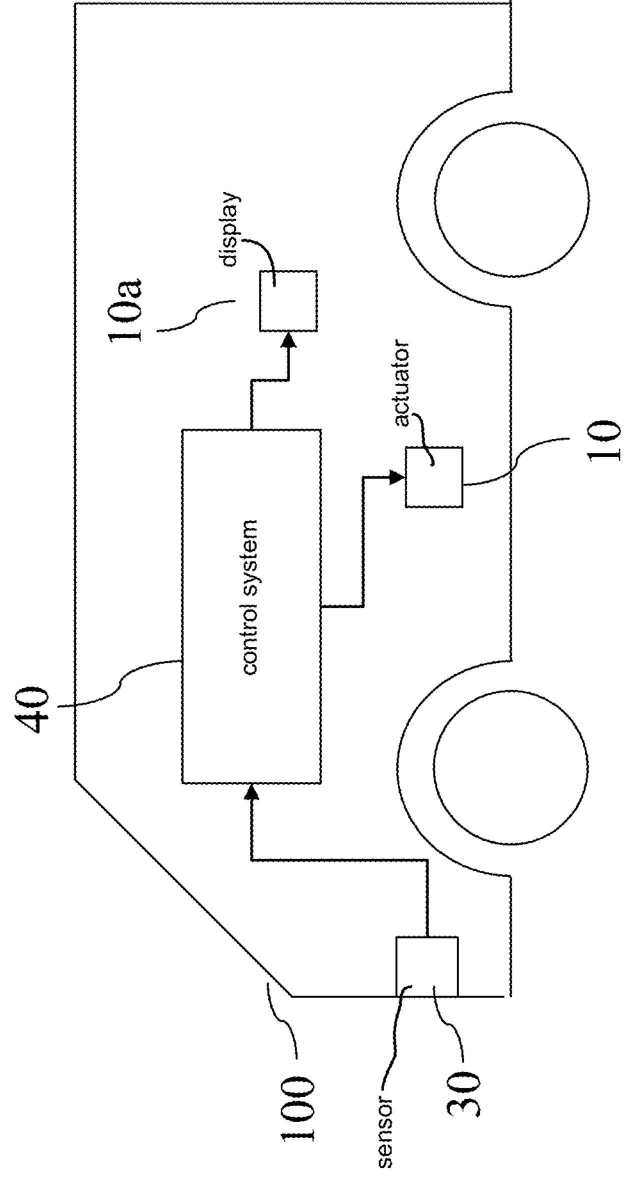
FIG. 4 shows the control system controlling an at least partially autonomous robot, according to an example embodiment of the present invention.

FIG. 4 shows an embodiment in which the control system (40) is used to control an at least partially autonomous robot, e.g., an at least partially autonomous vehicle (100).

The sensor (30) may comprise one or more video sensors and/or one or more radar sensors and/or one or more ultrasonic sensors and/or one or more LiDAR sensors. Some or all of these sensors are preferably but not necessarily integrated in the at least partially autonomous robot (100).

The image segmentation system (60) may be configured to perform a semantic segmentation or instance segmentation of the vicinity of the at least partially autonomous robot based (100) on the input image (x). In case anomalous regions (i.e., pixels or connected components of pixels classified as anomalous) are detected in the input image (x), the control signal (A) may be determined in accordance with this information, for example to avoid a path of the at least partially autonomous robot (100) to lead through the anomalous regions or to avoid a path of the at least partially autonomous robot (100) to come closer to the anomalous regions than a predefined threshold.

The actuator (10), which is preferably integrated in the vehicle (100), may be given by a brake, a propulsion system, an engine, a drivetrain, or a steering of the vehicle (100).

Alternatively or additionally, the control signal (A) may also be used to control the display (10*a*), e.g., for displaying the anomalous pixels detected by the image segmentation system (60). It is also possible that the control signal (A) may control the display (10*a*) such that it produces a warning signal if the vehicle (100) is close to a region comprising anomalous pixels. The warning signal may be a warning sound and/or a haptic signal, e.g., a vibration of a steering wheel of the vehicle.

In further embodiments, the at least partially autonomous robot may be given by another mobile robot (not shown), which may, for example, move by flying, swimming, diving or stepping. The mobile robot may, inter alia, be an at least partially autonomous lawn mower, or an at least partially autonomous cleaning robot. In all of the above embodiments, the control signal (A) may be determined such that propulsion unit and/or steering and/or brake of the mobile robot are controlled such that the mobile robot may avoid collisions with said identified objects.

Figure 5:
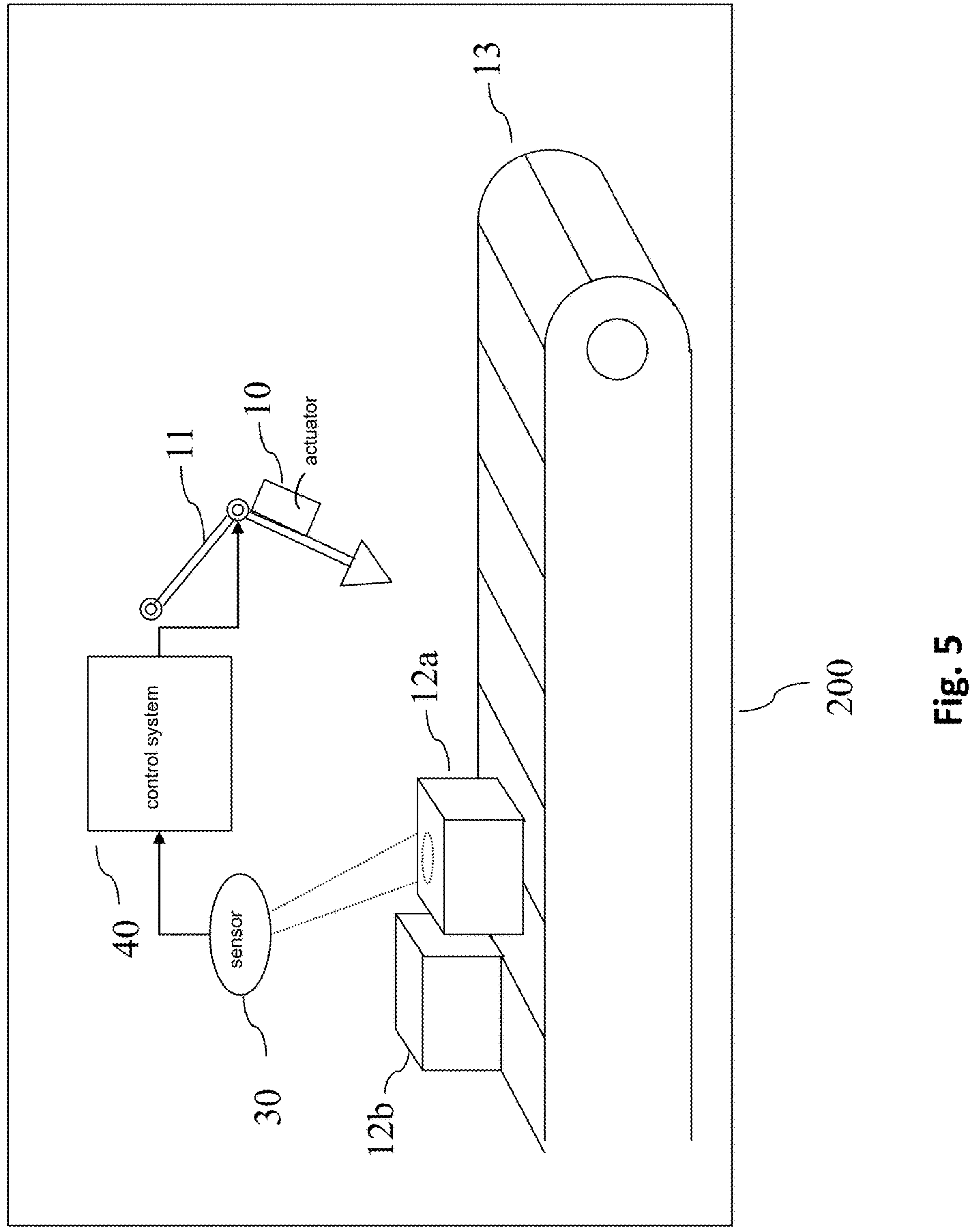
FIG. 5 shows the control system controlling a manufacturing machine, according to an example embodiment of the present invention.

FIG. 5 shows an embodiment in which the control system (40) is used to control a manufacturing machine (11), e.g., a punch cutter, a cutter, a gun drill or a gripper, of a manufacturing system (200), e.g., as part of a production line. The manufacturing machine may comprise a transportation device (13), e.g., a conveyer belt or an assembly line, which moves a manufactured product (12). The control system (40) controls an actuator (10), which in turn controls the manufacturing machine (11).

The sensor (30) may be given by an optical sensor which captures properties of, e.g., a manufactured product (12).

The image segmentation system (60) may determine parts of the input image (x) that comprise the manufactured product (12) device. The actuator (10) may then be controlled depending on a position of the manufactured product (12) for a subsequent manufacturing step of the manufactured product (12). For example, the actuator (10) may be controlled to cut the manufactured product at a specific location of the manufactured product itself. If the output signal (y) determines the existence of anomalous pixels on the transportation device (13) and/or a manufactured product (12), operation of the machine may be stopped and/or a human operator may be hailed to assess the matter. Alternatively, if the anomaly is detected on pixels belonging to a manufactured product, the actuator (10) may then be controlled as to remove the manufactured product from the transportation device.

Figure 6:
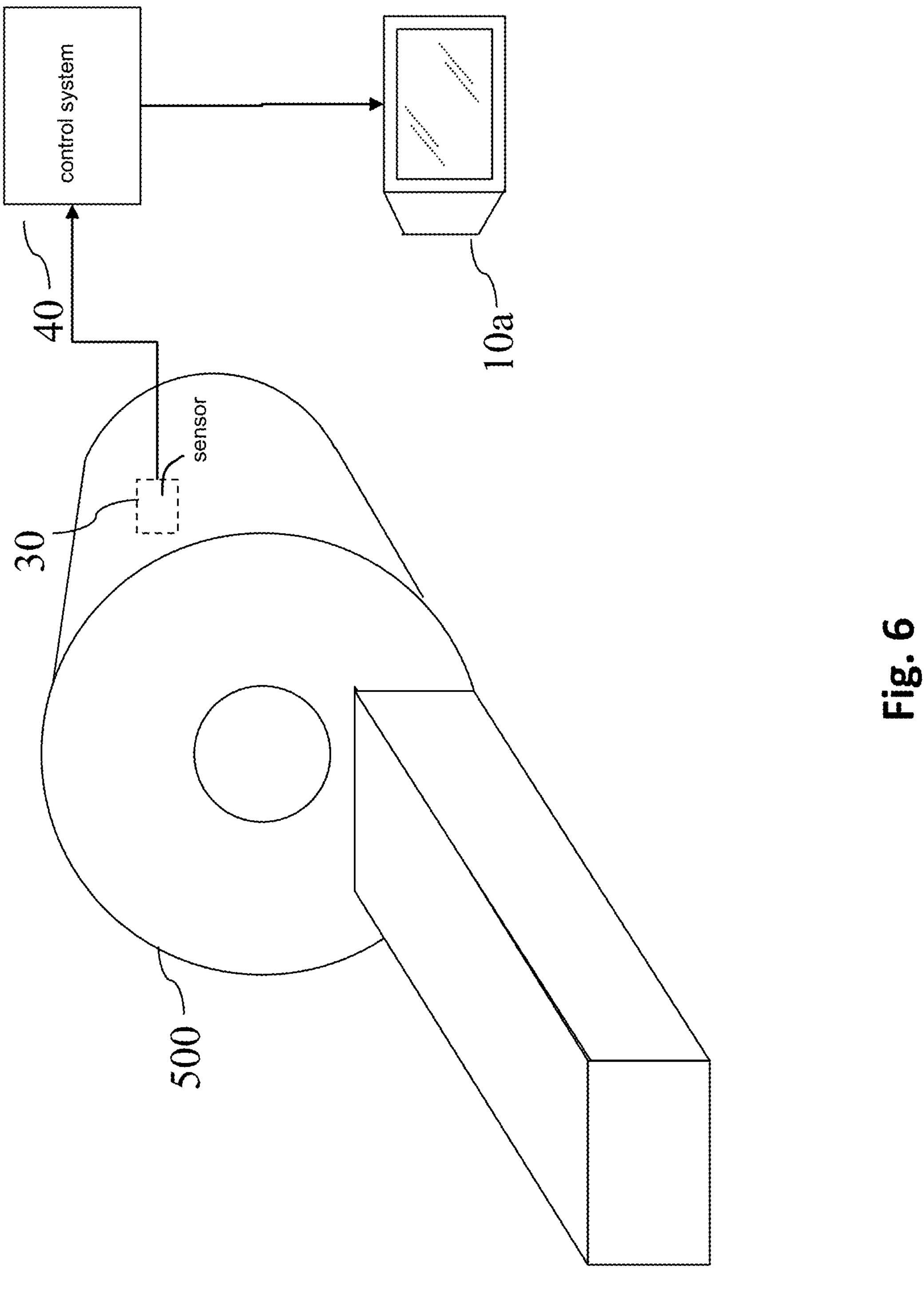
FIG. 6 shows the control system controlling a medical analysis system, according to an example embodiment of the present invention.

FIG. 6 shows an embodiment of a medical imaging system (500) controlled by the control system (40). The imaging system may, for example, be an MRI apparatus, x-ray imaging apparatus or ultrasonic imaging apparatus. The sensor (30) may, for example, be an imaging sensor which takes at least one image of a patient, e.g., displaying different types of body tissue of the patient.

The image segmentation system (60) may be configured to detect different types of tissue in the sensed image, e.g., by classifying the tissue displayed in the image into either malignant or benign tissue. This may be done by means of a semantic segmentation of the input image (x) by the image segmentation system (60). The control signal (A) may then be determined to cause the display (10*a*) to display different tissues, e.g., by displaying the input image (x) and coloring different regions of identical tissue types in a same color. The control signal (A) may further be chosen to color anomalous regions in a different color as to direct a physician's attention to the anomalous areas and inspect them in detail.

In further embodiments (not shown) the imaging system (500) may be used for non-medical purposes, e.g., to determine material properties of a workpiece. In these embodiments, the image segmentation system (60) may be configured to receive an input image (x) of at least a part of the workpiece and perform a semantic segmentation of the input image (x), thereby classifying the material properties of the workpiece. The control signal (A) may then be determined to cause the display (10*a*) to display the input image (x) as well as information about the detected material properties.

The term "computer" may be understood as covering any devices for the processing of pre-defined calculation rules. These calculation rules can be in the form of software, hardware or a mixture of software and hardware.

In general, a plurality can be understood to be indexed, that is, each element of the plurality is assigned a unique index, preferably by assigning consecutive integers to the elements contained in the plurality. Preferably, if a plurality comprises N elements, wherein N is the number of elements in the plurality, the elements are assigned the integers from 1 to N. It may also be understood that elements of the plurality can be accessed by their index.

What is claimed is:

1. A computer-implemented method for training an image segmentation system, comprising the following steps:

obtaining a training image and a training label map, wherein the training label map indicates pixels of the training image as belonging to an anomaly class;

providing the training image as input to the image segmentation system, wherein the image segmentation system determines values characterizing logits for different classes for pixels of the training image;

determining a loss value based on a loss function, wherein the loss function includes a first term that characterizes a logarithm of a sigmoid of logits determined for pixels in the training image, wherein the logarithm of the sigmoid is determined for pixels, which are labeled as belonging to the anomaly class in the training label map; and training the image segmentation system by minimizing the loss value.

2. The method according to claim 1, wherein the first term characterizes a logarithm of a sigmoid of a predefined amount of largest logits.

3. The method according to claim 1 wherein the first loss term is characterized by the following formula:

$$\mathcal{L}_{ood} = -\frac{1}{K \cdot N_{ood}} \sum_{i,j \in ood} \sum_{k \in S_{i,j}} \log\sigma\left(\lambda_{i,j}^{(k)}\right),$$

wherein i,j are height and width coordinates of a pixel, ood are pixel coordinates of pixels indicated as anomalous, $N_{ood}$ is the amount of pixels in ood, K is an amount of logits for which to determine a logarithm of a sigmoid, $S_{i,j}$ is a set of the K logits and $$\lambda_{i,j}^{(k)}$$

is a k-th logit in the set of logits for the pixel at position i,j.

4. The method according to claim 1, wherein the training image and the training label map is obtained by generating the training image and the training label map, wherein the generating of the training image and the training label map includes the following steps:

obtaining a first image and a first label map corresponding to the first image, and obtaining a second image and a second label map corresponding to the second image;

determining a third image, wherein the third image is determined by providing the second image as input to a machine learning system, wherein the machine learning system is configured for determining images in a style of the first image based on provided images;

determining the training image by replacing pixels from the first image with pixels from the third image, wherein the pixels from the third image are determined based on a class from the second label map;

determining the training label map by replacing class labels from the first label map with class labels indicating an anomaly class, wherein the class labels in the first label map are replaced for which corresponding pixels in the first image are replaced.

5. The method according to claim 4, wherein the replacing of class labels from the first label map is achieved by replacing class labels from the first label map with class labels from the second label map, wherein the class labels from the second label map are used for replacement for which corresponding pixels have been used as replacement in the first image, wherein the replaced class labels in the first label map are further indicated as resulting from replacement.

6. The method according to claim 4, wherein the first image is transformed in an augmentation operation before determining the training image.

7. The method according to claim 4, wherein the machine learning system determines its output based on providing its input to a masked noise encoder of the machine learning system and providing an output of the masked noise encoder to a StyleGAN2.

8. The method according to claim 4, wherein the first image includes a first dataset of first images and the machine learning system is trained to transfer input images into a style of the first images.

9. A computer-implemented method for determining an output signal, wherein the output signal characterizes a classification of a pixel of an input image as anomalous or not, wherein the method comprises the following steps:

providing the input image as input to an image segmentation system, wherein the image segmentation system has been trained by:

obtaining a training image and a training label map, wherein the training label map indicates pixels of the training image as belonging to an anomaly class, providing the training image as input to the image segmentation system, wherein the image segmentation system determines values characterizing logits for different classes for pixels of the training image, determining a loss value based on a loss function, wherein the loss function includes a first term that characterizes a logarithm of a sigmoid of logits determined for pixels in the training image, wherein the logarithm of the sigmoid is determined for pixels, which are labeled as belonging to the anomaly class in the training label map, and training the image segmentation system by minimizing the loss value;

determining, by the image segmentation system, logits for the pixel;

providing a classification of the pixel as anomalous in the output signal when a difference of a largest determined logit and a smallest determined logit is smaller or equal to a predefined threshold, and providing a classification of the pixel as non-anomalous in the output signal otherwise.

10. A training system, which is configured to train an image segmentation system, the training system configured to:

obtain a training image and a training label map, wherein the training label map indicates pixels of the training image as belonging to an anomaly class;

provide the training image as input to the image segmentation system, wherein the image segmentation system determines values characterizing logits for different classes for pixels of the training image;

determine a loss value based on a loss function, wherein the loss function includes a first term that characterizes a logarithm of a sigmoid of logits determined for pixels in the training image, wherein the logarithm of the sigmoid is determined for pixels, which are labeled as belonging to the anomaly class in the training label map; and train the image segmentation system by minimizing the loss value.

11. A control system, which is configured to:

determine an output signal, wherein the output signal characterizes a classification of a pixel of an input image as anomalous or not, the determining of the output signal including:

providing the input image as input to an image segmentation system, wherein the image segmentation system has been trained by:

obtaining a training image and a training label map, wherein the training label map indicates pixels of the training image as belonging to an anomaly class, providing the training image as input to the image segmentation system, wherein the image segmentation system determines values characterizing logits for different classes for pixels of the training image, determining a loss value based on a loss function, wherein the loss function includes a first term that characterizes a logarithm of a sigmoid of logits determined for pixels in the training image, wherein the logarithm of the sigmoid is determined for pixels, which are labeled as belonging to the anomaly class in the training label map, and training the image segmentation system by minimizing the loss value;

determining, by the image segmentation system, logits for the pixel;

providing a classification of the pixel as anomalous in the output signal when a difference of a largest determined logit and a smallest determined logit is smaller or equal to a predefined threshold, and providing a classification of the pixel as non-anomalous in the output signal otherwise;

determine a control signal based on the output signal;

control, using the control signal, an actuator and/or a display.

12. A non-transitory machine-readable storage medium on which is stored a computer program for training an image segmentation system, the computer program, when executed by a computer, causing the computer to perform the following steps:

obtaining a training image and a training label map, wherein the training label map indicates pixels of the training image as belonging to an anomaly class;

providing the training image as input to the image segmentation system, wherein the image segmentation system determines values characterizing logits for different classes for pixels of the training image;

determining a loss value based on a loss function, wherein the loss function includes a first term that characterizes a logarithm of a sigmoid of logits determined for pixels in the training image, wherein the logarithm of the sigmoid is determined for pixels, which are labeled as belonging to the anomaly class in the training label map; and training the image segmentation system by minimizing the loss value.

* * * * *